(12) United States Patent
Nicolas (10) Patent No.: US 11,296,743 B2
(45) Date of Patent: Apr. 5, 2022

(54) SYSTEM, METHOD, AND APPARATUS FOR WAVEFORM TRANSFORMATION (71) Applicant: Nicolas US Inc., Tampa, FL (US)

(72) Inventor: Pierre Hervé Nicolas, Morvillers-Saint-Saturnin (FR)

( * ) Notice: Subject to any disclaimer, the term of this patent is extended or adjusted under 35 U.S.C. 154(b) by 196 days.

(21) Appl. No.: 16/220,701

(22) Filed: Dec. 14, 2018

(65) Prior Publication Data
US 2019/0123775 A1 Apr. 25, 2019

Related U.S. Application Data (63) Continuation of application No. 15/193,879, filed on Jun. 27, 2016, now abandoned.

(60) Provisional application No. 62/186,393, filed on Jun. 30, 2015.

(51) Int. Cl.
H04B 1/3827 (2015.01)
B41J 2/385 (2006.01)
B41J 11/00 (2006.01)
C09D 11/00 (2014.01)

(52) U.S. Cl.
CPC ............ H04B 1/3838 (2013.01); B41J 2/385 (2013.01); B41J 11/00 (2013.01); C09D 11/00 (2013.01)

(58) Field of Classification Search
CPC ........ H04B 1/3838; C09D 11/00; B41J 11/00; B41J 2/385; H01Q 1/245
See application file for complete search history.

(56) References Cited

U.S. PATENT DOCUMENTS

| 2006/0065662 | A1 | 3/2006 | Goglio |
| 2007/0128590 | A1 | 6/2007 | Boehm |
| 2007/0208363 | A1 | 6/2007 | Lai |
| 2009/0102055 | A1 | 4/2009 | Aoki |
| 2014/0051480 | A1 | 2/2014 | Cruz |

FOREIGN PATENT DOCUMENTS

WO   WO 2012/175767   * 12/2012

OTHER PUBLICATIONS

Technology, https://youmatrixit.com/technology/.*
Muehsam D, Chevalier G, Barsotti T, Gurfein BT. An Overview of Biofield Devices. Glob Adv Health Med. 2015;4(Suppl):42-51. doi:10.7453/gahmj.2015.022.suppl.*
Written opinion of the International Searching Authority in connection with PCT/US 16/39560.*

* cited by examiner

Primary Examiner — Lam S Nguyen
(74) Attorney, Agent, or Firm — Larson & Larson, P.A.; Frank Liebenow; Justin P. Miller (57) ABSTRACT A process for producing biotech adapters includes ionization of inks that are later used to print on any of a multitude of surfaces while under the influence of specialized electromagnetic radiation, thereby such printing creates the missing frequency that will complete the man-made frequency thus obtaining a bio compatible frequency known to be beneficial to the health of the user. For example, the process is used to print a biotech adapter having an adhesive backing. The biotech adapter is then attached (e.g. by the adhesive) to the user's electronic device (e.g., cellular phone), preferably at a location where such harmful radio waves are emitted in the direction of the user's head. The biotech adapter reacts to the harmful radio waves, completing the missing radio waves by emitting radio waves that are known to be beneficial to humans.

6 Claims, 12 Drawing Sheets

SYSTEM, METHOD, AND APPARATUS FOR WAVEFORM TRANSFORMATION

CROSS-REFERENCE TO RELATED APPLICATION

This application is a continuation of U.S. application Ser. No. 15/193,879 filed Jun. 227, 2016, which claims the benefit of U.S. provisional application No. 62/186,393 filed on Jun. 30, 2015, the disclosure of which is incorporated by reference.

FIELD

This invention relates to the field of health and more particularly to a system, method, and apparatus for reducing health risks from electronic devices such as cellular phones.

BACKGROUND

In recent years, cellular phone usage has spiraled to a point where almost everyone in the country has and uses a cellular phone. Various transmission protocols and transmission frequencies have been used, often varying by geographic region. Examples of protocols include CDMA, TDMA, GSM, etc., while examples of transmission frequencies include 900 MHz, 2.4 GHz, etc.

With every new technology, new risks and issues emerge. For example, it is well known that using a cellular phone while driving (or performing other tasks) distracts the driver/operator, often leading to accidents. Accidents from using a cellular phone are easily measured and those who use cellular phones while operating equipment such as vehicles and trucks are usually aware of the risks, yet often ignore such risks.

Ever since the early deployment of cellular technology, a lesser quantifiable risk was recognized due to the proximity of a considerable power output of radio frequency emissions in close proximity to the user's head, and hence, the user's brain. Many studies have been performed and data analyzed showing at least some increase of risk from the use of cellular technology. Early worries related to the use of transmission frequencies in the microwave range, which are known to resonate with water molecules, thereby increasing temperatures of the water molecules, as is known and used in microwave ovens.

Some of these studies were refuted, especially by those with vested interests such as cell phone operators and manufacturers, but still, there are many indications that there is at least some health risks in using a cellular phone in close proximity to one's head.

What is needed is a device/system that will react to harmful emissions from electronic devices such as cellular phones, increasing emissions of wavelengths that have been shown to be beneficial to an individual's health. For example, The International Agency for Research on Cancer (IARC), an organization within the World Health Organization, has classified radio frequency fields (e.g., those emitted by cellular phones) as "possibly carcinogenic to humans." This declaration is based upon limited evidence from human studies, limited evidence from studies of radio frequency energy and cancer in rodents, and weak mechanistic evidence (from studies of geno-toxicity, effects on immune system function, gene and protein expression, cell signaling, oxidative stress, and apoptosis, along with studies of the possible effects of radiofrequency energy on the blood-brain barrier). In another example, the National Cancer Institute (NCI) has stated that: "Studies thus far have not shown a consistent link between cell phone use and cancers of the brain, nerves, or other tissues of the head or neck. More research is needed because cell phone technology and how people use cell phones have been changing rapidly."

SUMMARY

A process for producing biotech adapters includes ionization of inks that are later used to print on any of a multitude of surfaces while under the influence of specialized electromagnetic radiation, thereby such printing creates the missing frequency that will complete the man-made frequency thus obtaining a bio compatible frequency known to be beneficial to the health of the user. For example, the process is used to print a biotech adapter having an adhesive backing. The biotech adapter is then attached (e.g. by the adhesive) to the user's electronic device (e.g., cellular phone), preferably at a location where such harmful radio waves are emitted in the direction of the user's head. One preferred location is directly on the battery, when possible. The biotech adapter reacts to the harmful radio waves, completing the missing radio waves by emitting radio waves that are known to be beneficial to humans.

In one embodiment, a biotech adapter is disclosed including a substrate with an adhesive backing. There are a plurality of inks that, prior to printing, are subjected to an ionization field for a period of time (e.g., 15,000 VDC for 48 hours) for increasing the integration of the scalar component by increasing the polarization of the Van der Waals forces of each of the inks. The biotech adapters are then printed by a printing press. A scalar generator is interfaced to the printing press such that when the printing press deposits the inks onto the substrate, two electromagnetic waves are present at the substrate with a nonzero orbital angular momentum, such that the two electromagnetic waves cancel each other out by counter phase at the location at which the ink is deposited, the electromagnetic waves having a field frequency. The biotech adapter has ink so deposited by the printer and possesses an integrated scalar characteristic of a magnetic oscillation wavelength close to that of the structure of water.

In another embodiment, a system for producing biotech adapters is disclosed including an ionization device for ionizing one or more inks prior to printing of the biotech adapter and electromagnetic wave generators. Each electromagnetic wave generator is interfaced to a loop coil for the production of an orbital angular momentum. The system includes a printer that uses the inks after ionization to print the biotech adapter. For each print mechanism of the printer, there are two loop coils positioned at equal distance from the point where the inks are deposited on the biotech adapter. In this, a second loop coil of the two loop coils is phase shifted by 180 degrees from a first loop coil of the loop coils, and accordingly, an orbital angular momentum is produced in order to introduce a torsion component into the inks of the biotech adapter.

In another embodiment, a biotech adapter is disclosed including a substrate and inks printer on the substrate. The inks include a torsion component such that the inks produce radio waves that are beneficial to lifeforms when exposed to radio waves in the microwave range.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Reference will now be made in detail to the presently preferred embodiments of the invention, examples of which are illustrated in the accompanying drawings. Throughout the following detailed description, the same reference numerals refer to the same elements in all figures.

Throughout this description, a cellular phone is used as an example of a device onto which biotech adapters are installed. A cellular phone is used as an example but there are many devices that would benefit the inclusion of such biotech adapters, all of which are anticipated and included here within. Further, although detail descriptions of printing biotech adapters onto a sticky-backed label are shown, there is no limitation as to what substrate the printing targets as it is equally anticipated to use the same or a similar process to print directly upon objects such as electronic enclosures, electronic device cases, electronic device doors, antenna, articles of clothing (e.g., hats), etc.

Figure 1:
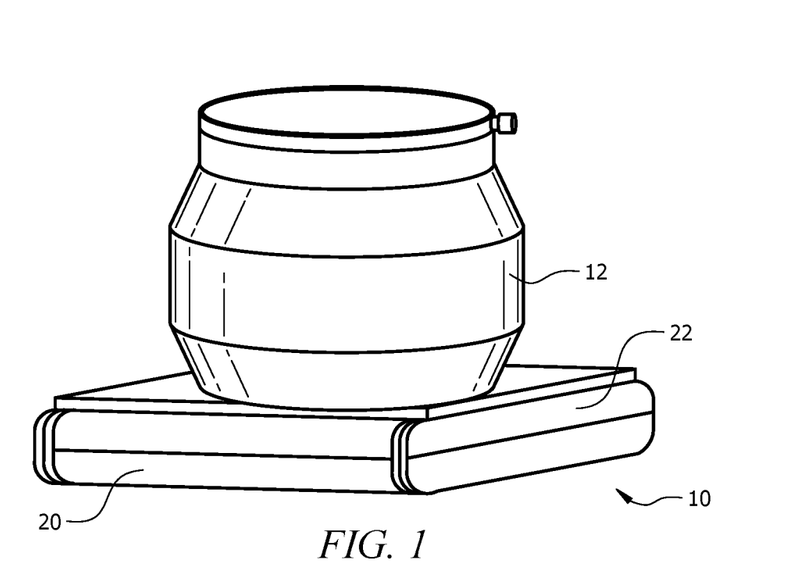
FIG. 1 illustrates a view of a container of ink being ionized on a ionization device.
Figure 2:
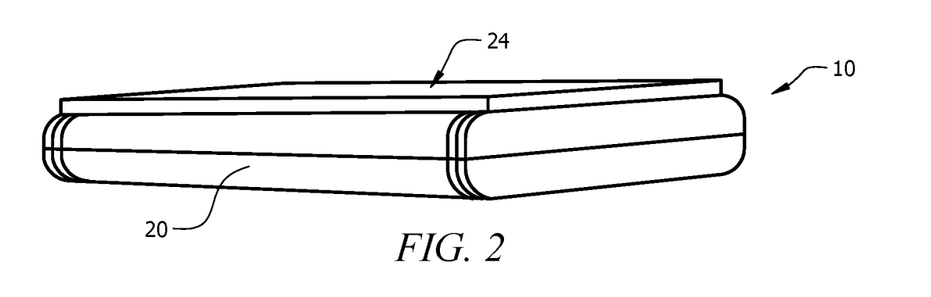
FIG. 2 illustrates a view of the ionization device.
Figure 3:
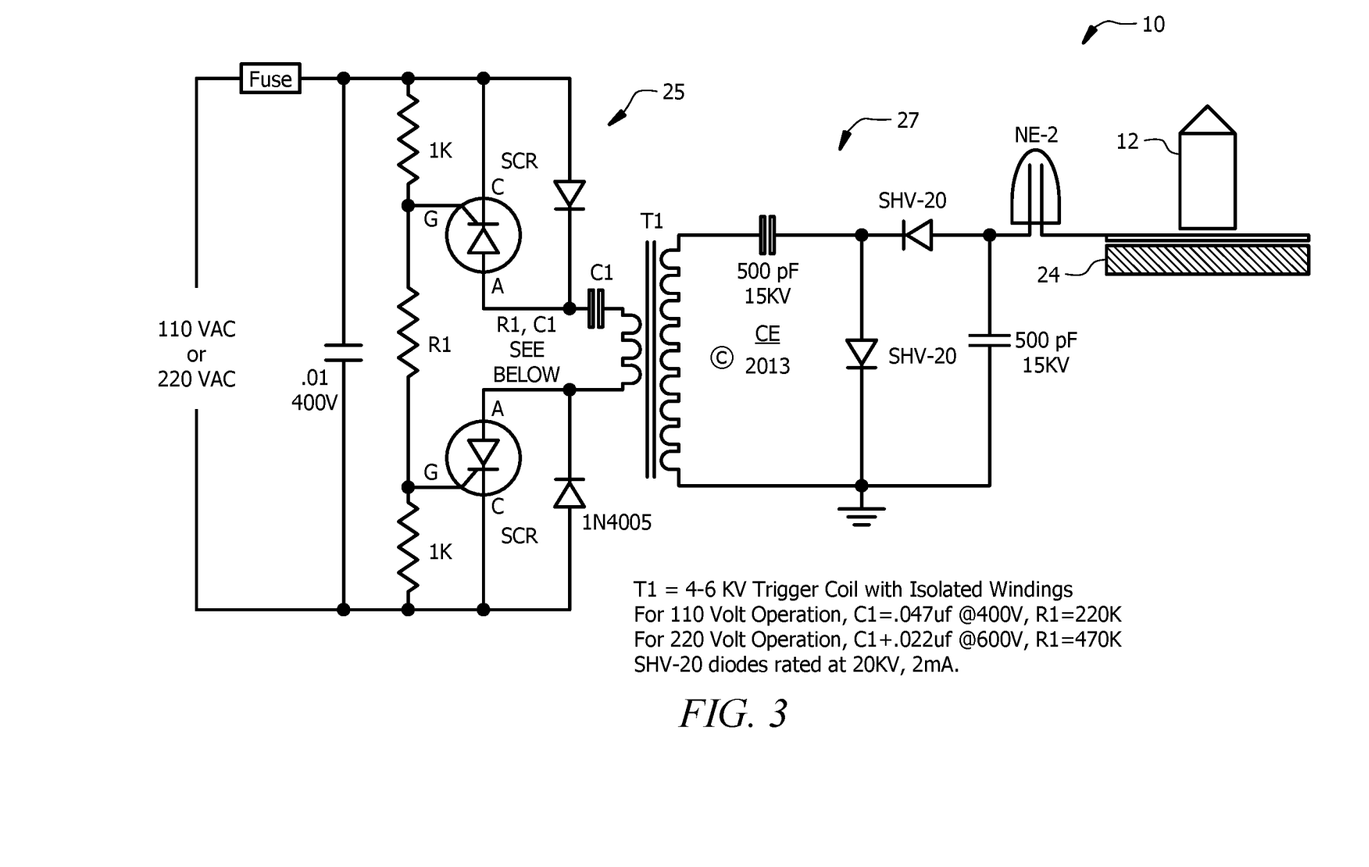
FIG. 3 illustrates an exemplary schematic view of the ionization device.

Referring to FIGS. 1-3, views of an exemplary ionization device 10 are shown. Before printing, the ink (shown in a container 12) is ionized by exposing the ink to a high voltage direct current potential. The ionization device 10 has a charged plate 24 upon which the container 12 with ink is placed. The plate 24 is insulated by a high voltage insulator 24 to reduce leakage through the enclosure 20. Although any source of power is anticipated, in the example shown, either 110 VAC or 220 VAC is provided to the ionization device 10 through a power cord 22.

An exemplary circuit is shown in FIG. 3 having a line voltage section 25 that drives a four to six (4-6) kilovolt trigger coil (e.g., as those that are often used to trigger Xenon flash tubes) with pulses through a capacitor C1. The high voltage output windings of the trigger coil is converted to direct current (DC) through a diode voltage-doubler using two high voltage diodes and two high voltage capacitors. In this example, a neon bulb 23 is used to limit current to the charged plate 24. It is preferred that the trigger coil, T1, have isolated windings to reduce the potential of electrocution.

Although a range of DC voltage potentials is possible, in one embodiment, the DC voltage potential at the charged plate 24 is 15,000 Volts DC. In a preferred embodiment, the charged plate 24 is made of copper.

It is desirable that the ink be positioned within ten centimeters (10 cm) of the charged plate 24 and that the ink be exposed to the ionization field for approximately 48 hours.

Figure 4:
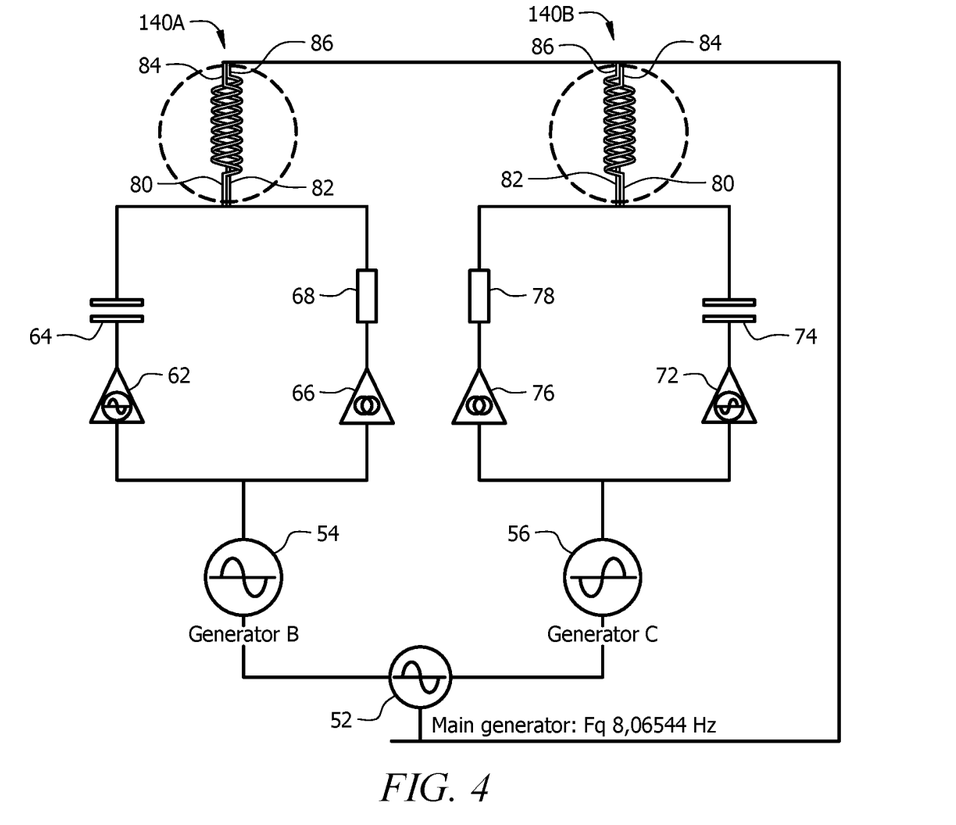
FIG. 4 illustrates an exemplary schematic view of one field generator used in the fabrication process.

Referring to FIG. 4, an exemplary schematic view of one field generator used in the fabrication process is shown. In this exemplary field generator, a source of a sine wave 52 produces a sine wave frequency of 8.06544 Hz, a frequency that is known to be beneficial to life forms. The sine wave of such frequency feeds a non-inverting driver 54 and an inverting driver 56. The output of the non-inverting driver 54 is in phase with the sine wave produced by the source of the sine wave 52, while the output of the inverting driver 56 is 180 degrees out-of-phase with the sine wave produced by the source of the sine wave 52.

The in-phase sine wave is conducted to a frequency driver 62 and a current driver 66. The frequency driver 62 connects to a first end 80 of a first winding 80/84 of a toroidal coil A (shown in detail in FIG. 5) through a capacitor 64. The current driver 66 connects to a first end 82 of a second winding 82/86 of the toroidal coil 140A through an inductor 68. Both second ends 84/86 of the windings 80/84/82/86 are connected to a return path. Through selection of capacitor 64 and inductor 68 values, the in-phase sine wave is shifted 90 degrees such that the sine wave driving the second winding 82/86 is 90 degrees out of phase with the sine wave driving the first winding 80/84.

The 180 degrees out-of-phase sine wave is conducted to a second frequency driver 72 and a second current driver 76. The second frequency driver 72 connects to a first end 80 of a first winding 80/84 of a second toroidal coil 140B (same or similar construction to toroidal coil 140A) through a capacitor 74. The second current driver 76 connects to a first end 82 of a second winding 82/86 of the toroidal coil B through an inductor 78. Again, both second ends 84/86 of the windings 80/84/82/86 are connected to a return path. Again, through selection of capacitor 74 and inductor 78 values, the in-phase sine wave is shifted 90 degrees such that the sine wave driving the second winding 82/86 is 90 degrees out of phase with the sine wave driving the first winding 80/84.

Figure 10:
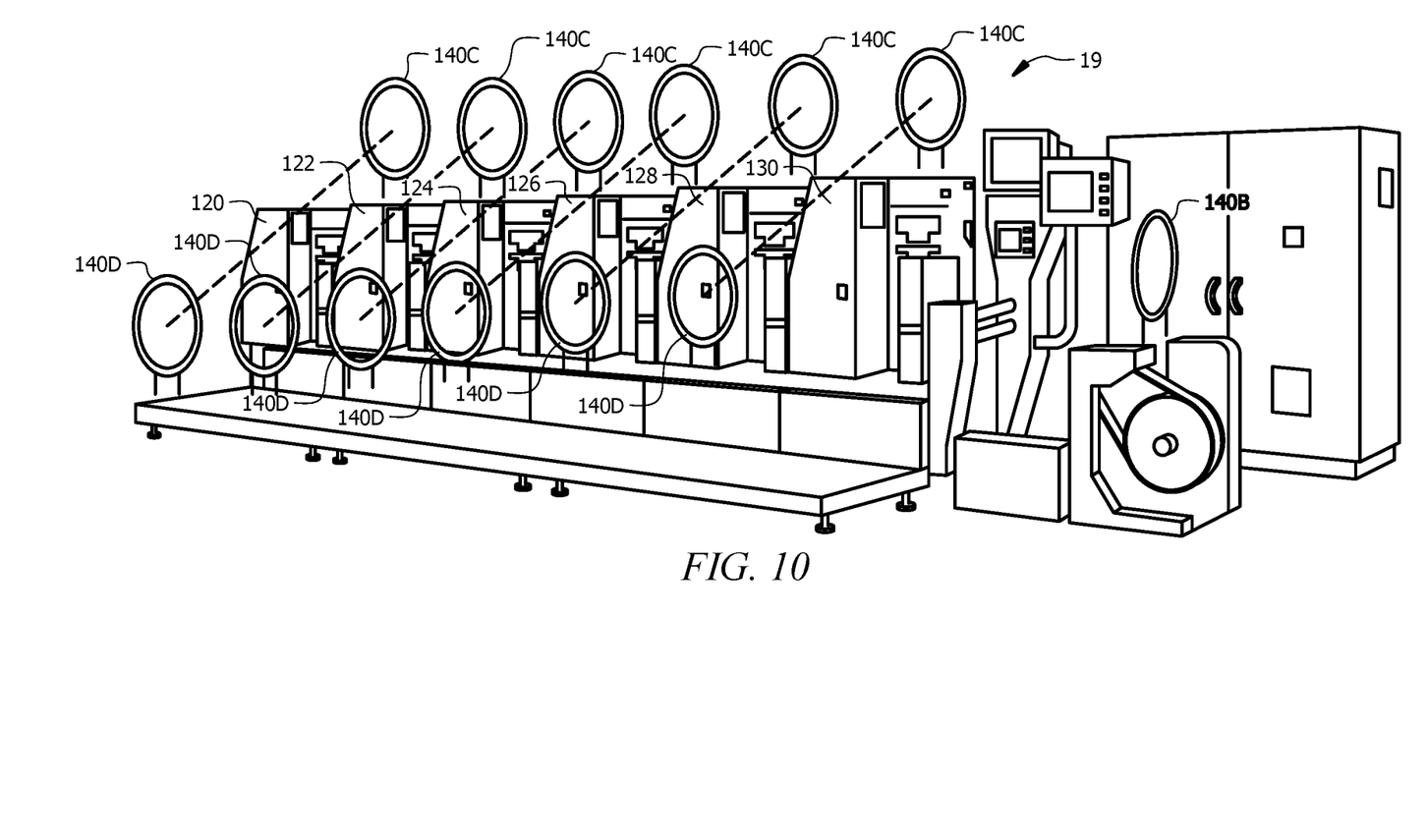
FIG. 10 illustrates an exemplary printing system outfitted pairs of coils, one pair for each print mechanism.
Figure 11:
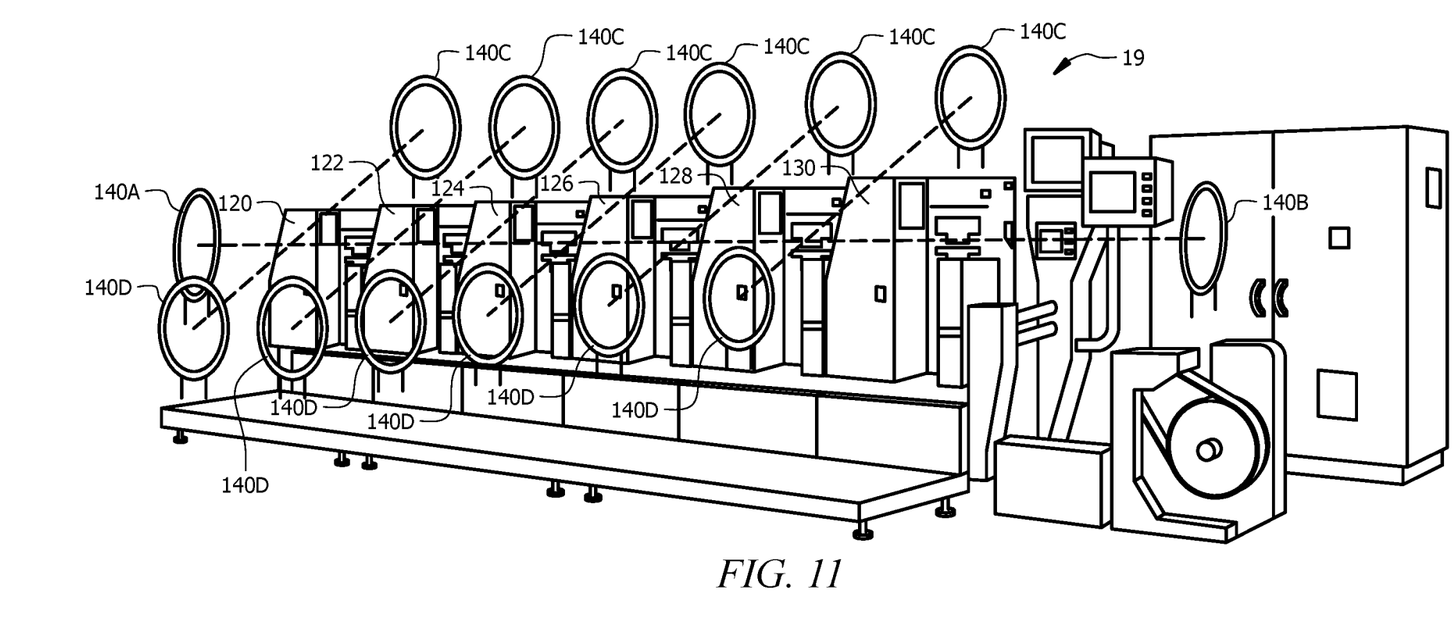
FIG. 11 illustrates an exemplary printing system outfitted pairs of coils, one pair for each print mechanism and a pair of coils, one at each end.
Figure 12:
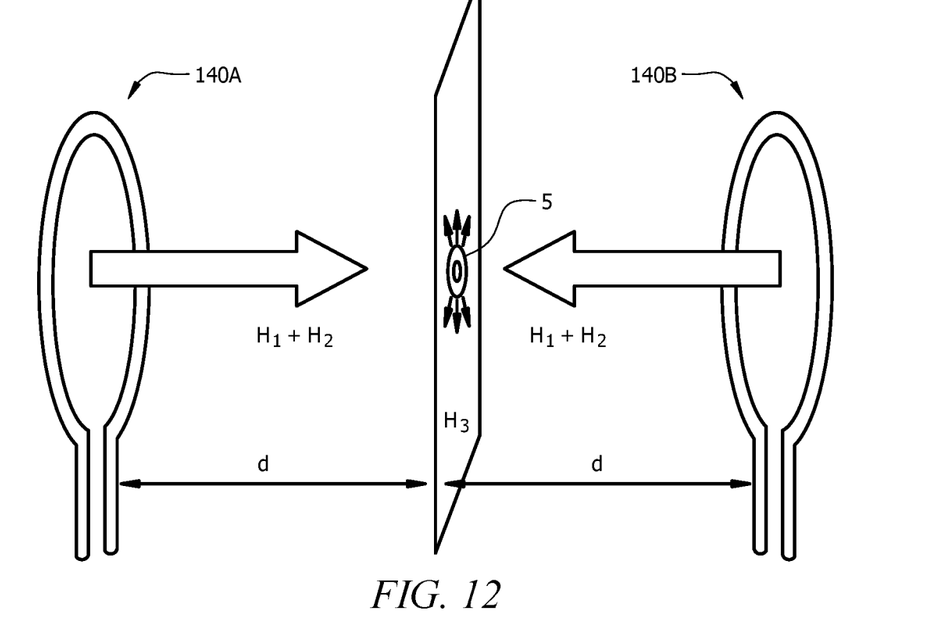
FIG. 12 illustrates a schematic view of the operation of two coils.
Figure 13:
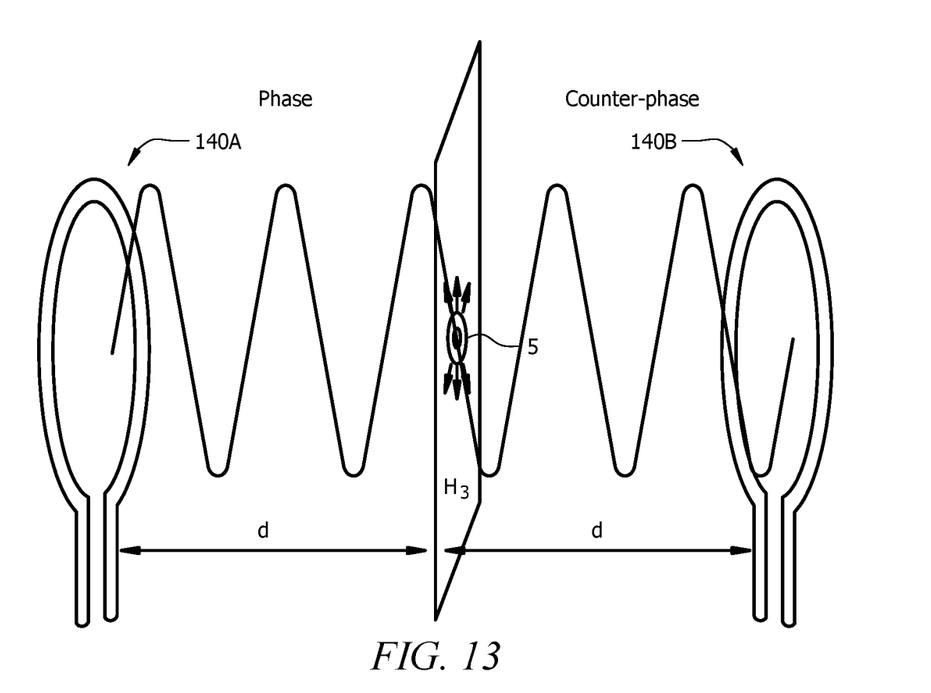
FIG. 13 illustrates a second schematic view of the operation of two coils.
Figure 14:
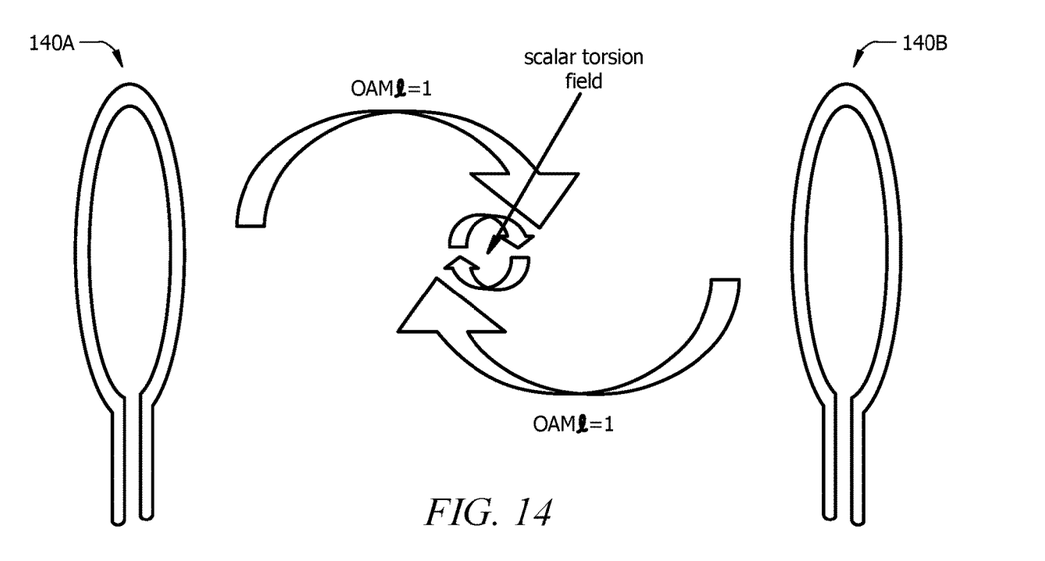
FIG. 14 illustrates a third schematic view of the operation of two coils.

By positioning, for example, a print mechanism between the coils 140A/140B as shown in FIGS. 6-11, wave fields are produced as shown in FIGS. 12-14, as will be described.

Figure 5:
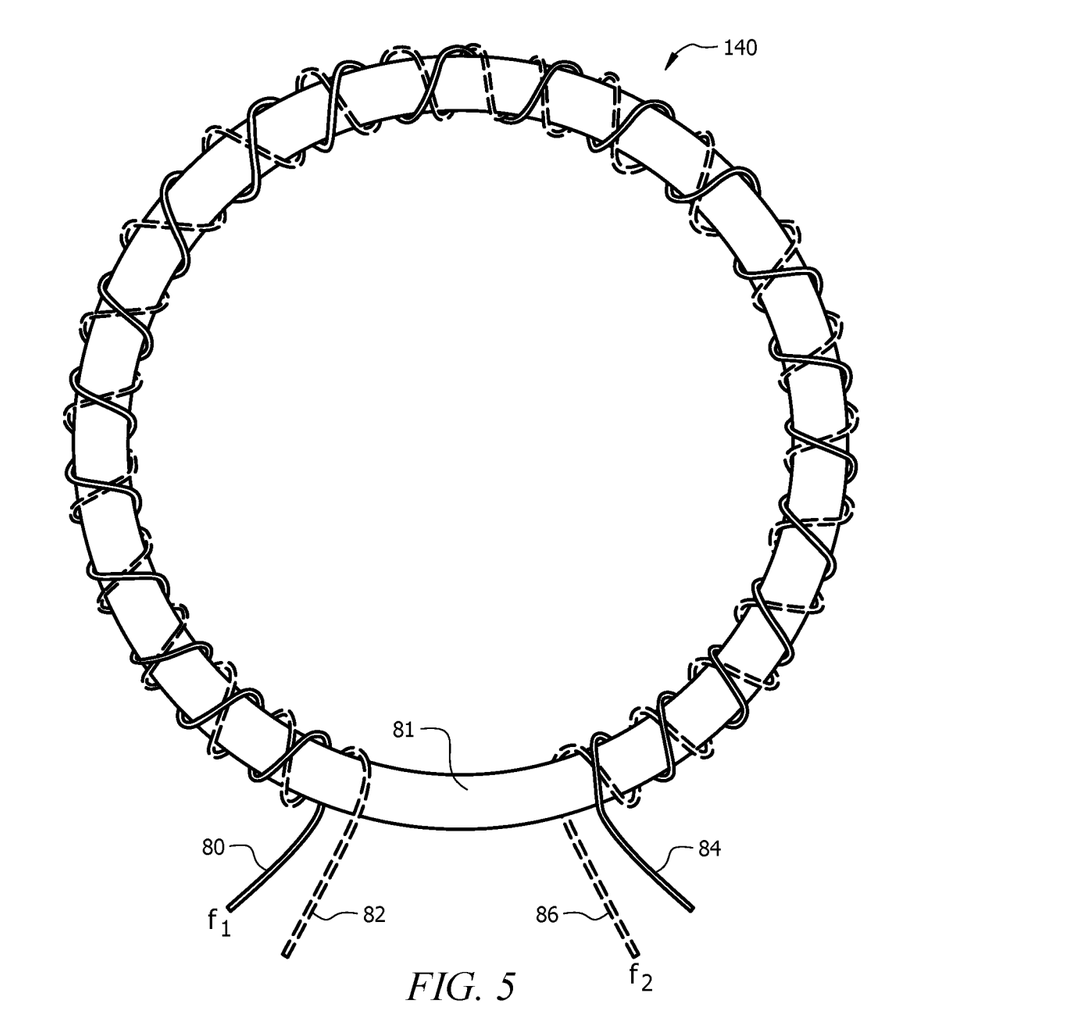
FIG. 5 illustrates an exemplary coil used in the fabrication process.

Referring to FIG. 5, an exemplary coil 140A (coil 140B is the same or similar) used in the fabrication process is shown. In this example of the coils 140A/140B used to generate the proper field, one wire 80/84 is preferably wound around the toroidal core 81 in a first direction and the other wire 82/86 is wound around the toroidal core 81 in an opposite direction. Using two coils 140A/140B, positioned at a distance from each other, one fed by the sine wave frequency of 8.06544 Hz and one fed by the 180 degree out-of-phase sine wave frequency of 8.06544 Hz (as described above), the desired Orbital Angular Moment (OAM) as described in FIGS. 12-14 (see below) is produced. In such, the first coil 140A receives the sine wave in phase (coil 140A, winding 80/84) and 90 degrees shifted (coil 140A, winding 82/86) and the second coil 140B receives the sine wave 180 degrees shifted (coil 140B, winding 80/84) and 270 degrees shifted (coil 140B, winding 82/86).

In one embodiment, the number of turns of each wire is 3,330 turns on a toroidal core having an overall diameter of approximately 465 millimeters (465 mm) and a thickness of approximately 27 millimeters (27 mm). With this number of turns of wire for each winding 80/84/82/86 and core dimension/composition, each winding 80/84/82/86 is driven with a voltage of approximately 1.29 volts at a frequency of 8.06544 Hz and a current of approximately 0.16 amps.

Figure 6:
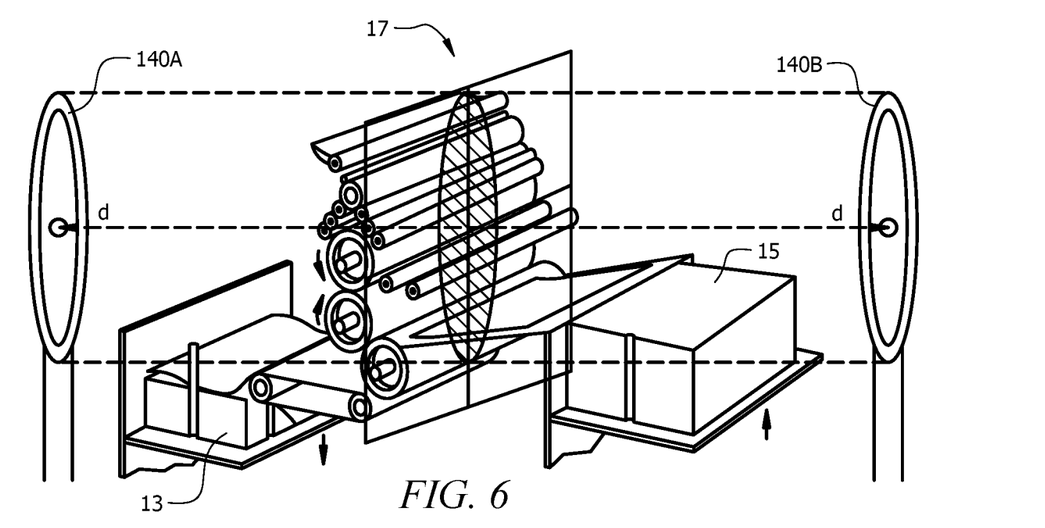
FIG. 6 illustrates a pair of the coils arranged in one direction around a printing mechanism.
Figure 7:
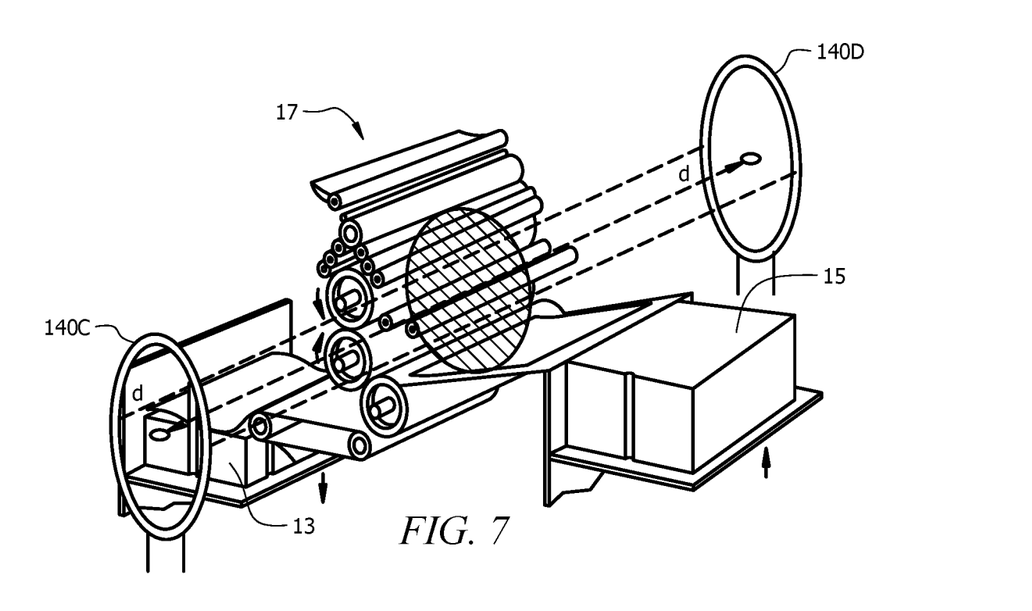
FIG. 7 illustrates a pair of the coils arranged offset by 90 degrees around a printing mechanism.

Referring to FIGS. 6 and 7, coils 140A/140B arranged in one direction around a printing mechanism 15 (FIG. 6) and coils 140C/140D arranged in an opposing direction (90 degrees offset) around the printing mechanism 15 (FIG. 7) are shown. In order to create the Orbital Angular Moment (OAM) to affect the ionized ink 12 that is used in the printing process, pairs of coils 140A/140B are positioned at a distance, d, from the individual printing mechanisms 15. There is no limit to the number of printing mechanisms 15; typically there is one printing mechanism 15 for each color to be printed such as six printing mechanisms 15 for a six-color print.

Figure 9:
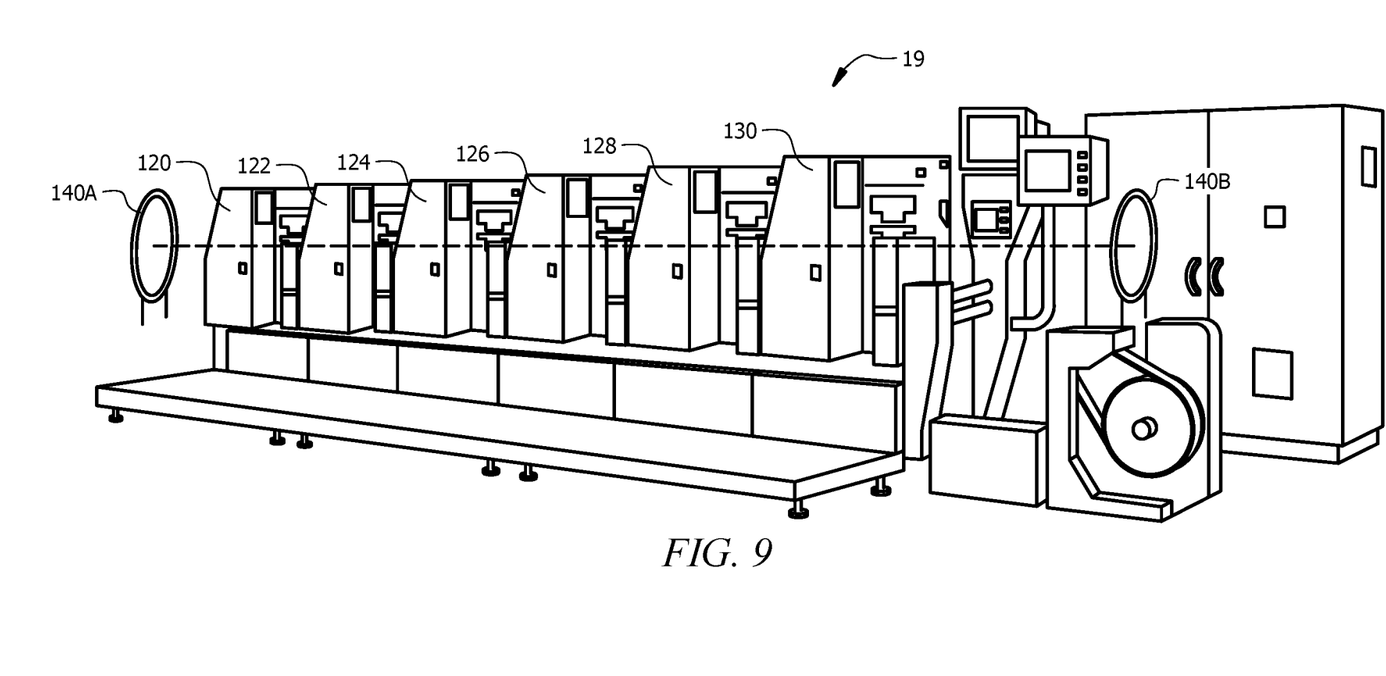
FIG. 9 illustrates an exemplary printing system outfitted with a pair of coils, one at each end.

FIG. 9 shows an exemplary printing system of the prior art.

As will be shown in FIGS. 9-11, each printing mechanism 15 is modified to have one pair of dedicated coils 140C/140D, preferably positioned in line with the plane of printing while the overall printer 19 has one pair of coils 140A/140B at each end of the printer 19, preferably offset from the pairs of dedicated coils 140C/140D by 90 degrees to produce the Orbital Angular Moment (OAM) field at the location of printing.

For completeness, a source paper tray 11 and a destination paper tray 13 are shown. For brevity reasons, the detail mechanisms of the printer mechanisms 15 are not described, as such is known in the art.

Figure 8:
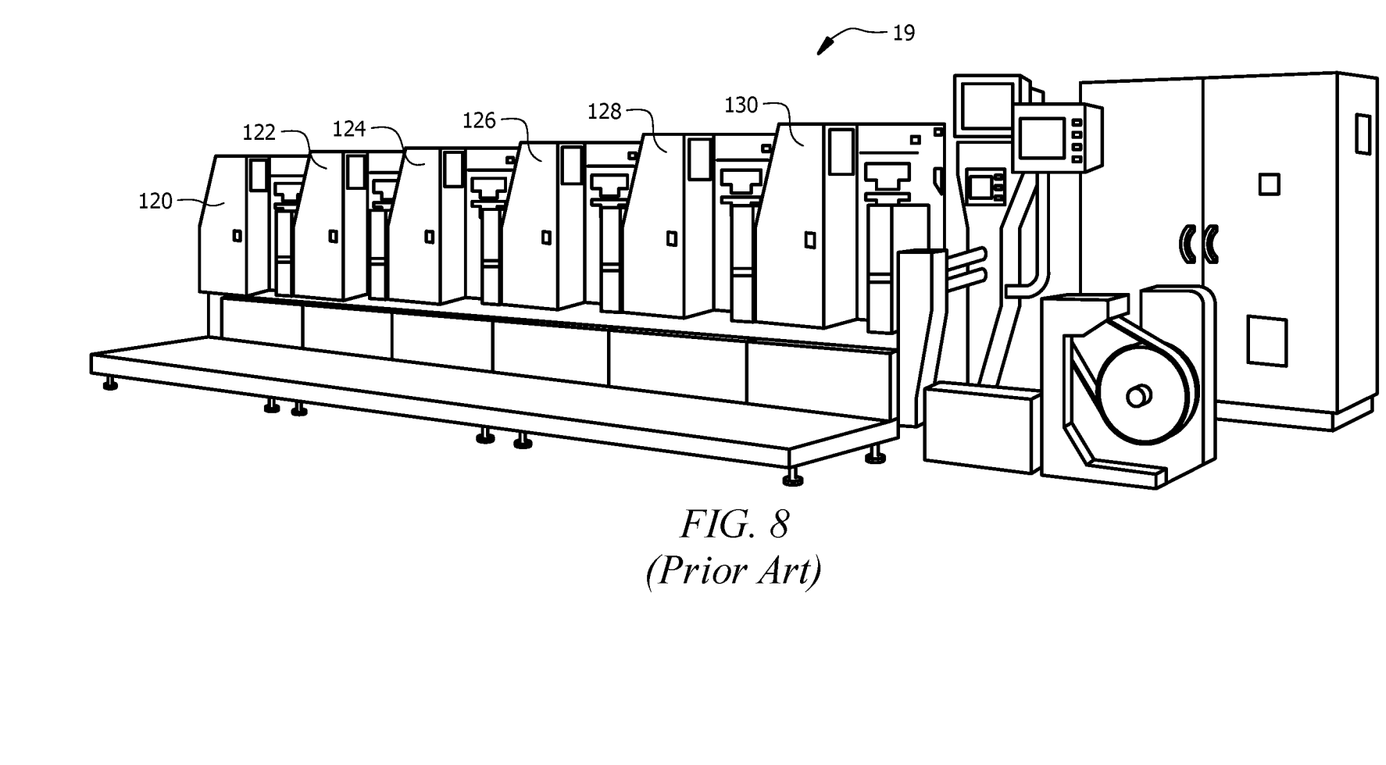
FIG. 8 illustrates an exemplary six color printing system of the prior art.

Referring to FIG. 8, an exemplary six color printing system 19 of the prior art is shown. In this example of a printing system 19, six individual printing mechanisms 17 are connected to produce a six-color print output. As an example, a first print mechanism 17 prints cyan 120, a second print mechanism 17 prints magenta 122, a third print mechanism 17 prints yellow 124, a fourth print mechanism 17 prints black 126, a fifth print mechanism 17 prints silver 128, and a sixth print mechanism 17 prints gold 130.

Referring to FIGS. 9-11, an exemplary printing system outfitted with pairs of coils is shown. In FIG. 9, a pair of coils 140A/140B is shown, one each at each end of the printing system 19. As above, one coil 140A has a first set of windings 80/84 that are driven by the sine wave frequency of 8.06544 Hz and a second set of windings that are driven by the sine wave frequency of 8.06544 Hz shifted in phase by 90 degrees; and the other coil 140B has the a first set of windings 80/84 driven by the sine wave frequency of 8.06544 Hz that is 180 degrees shifted and a second set of windings that are driven by the sine wave frequency of 8.06544 Hz shifted in phase by 270 degrees.

In FIG. 10, pairs of coils 140C/140D are positioned, one pair surrounding each print mechanism 17. These pairs of coils 140C/140D are positioned at a 90 degree offset to the print mechanism 17, one for each print mechanism 17. As above, one coil 140A from each pair has the a first set of windings 80/84 that are driven by the sine wave frequency of 8.06544 Hz and a second set of windings that are driven by the sine wave frequency of 8.06544 Hz shifted in phase by 90 degrees; and the other coil 140B has the a first set of windings 80/84 driven by the sine wave frequency of 8.06544 Hz that is 180 degrees shifted and a second set of windings that are driven by the sine wave frequency of 8.06544 Hz shifted in phase by 270 degrees.

In FIG. 11 the printing system 19 is shown with both sets of coils 140A/140B. For each print mechanism 17, a pair of coils 140C/140D is set on each side of the print mechanism 17. At each end of the print system 19 is a set of coils 140A/140B. Again, the coils are driven as described above providing the Orbital Angular Moment (OAM) at the location of printing.

Referring to FIGS. 12-14, schematic views of the operation of two coils 140A/140B are shown.

A pair of polar and/or non-polar dipoles (coils) 140A/140B are connected to an electromagnetic wave of a nonzero (I≠0) orbital angular momentum, preferably the medium structure itself is at a nanometric level, and induces a deformation of the forces of Van der Waals. The material (e.g., ink) impacted this way is influenced by the the electromagnetic torsion wave and retains a residual torsion field (or scalar field). The characteristics of this scalar field are related to the frequency of the original electromagnetic wave, and a deformation of the Van der Waals Forces, the density of the material, and the intensity of the magnetic field passing through the material (e.g., ink) or the surface (e.g., paper), and at the time of the angular momentum of the rotation of the electromagnetic wave. The fabrication process includes a material whose scalar field can interact with electromagnetic waves, and the structure and balance of the water molecule.

One application of such process is to obtain materials in plane surface (2D) or in volume (3D) that attenuate the induced effect on water molecules by hyper frequencies including electromagnetic waves in the microwave frequency range (mainly 0.8 GHz-30.8 GHz).

In one embodiment, the process is used in the production of labels, protective shells or other items that are positioned on or in an emitter of electromagnetic waves such as on or in a mobile phone, portable computer, music player, etc. Placement of such labels change the impact of electromagnetic waves on the water molecule and, therefore, modify the impact of the electromagnetic waves on the biological milieu (generation of a principle of biocompatibility). Other applications are anticipated such as the creation of materials or containers for the improvement of water quality; as well as, the creation of materials having an interaction with intracellular water, thus with the development and well-being of plants, animals, and humans.

In FIG. 12, an electromagnetic wave is generated by magnetic loop antennae 140A/140B with a principle of de-phasing a phase. This triggers the generation of an electromagnetic wave with a specific orbital angular momentum (OAM Orbital Angular Momentum). This principle is well defined in the framework of quantum kinetics (with J=L+S where J is the angular momentum of the electromagnetic wave, L the kinetic orbital momentum and the S intrinsic angular momentum or Spin). The electromagnetic waves with orbital angular momentum whose value I is different from 0 (zero) have a spiral characteristic which, when penetrating a surface or a volume, induce an effect of torsion at the level of the structure of matter.

Two specific electromagnetic waves with opposing phases are generated with OAM, such that the electromagnetic waves cancel each other out within the material level that is to be structured (e.g., the ink). This obtains a non-negligible action is on the extremely minute cohesion fields of matter (Van der Waals forces). Thus, if the rotation of the Poynting vectors are in phase, a ' Torsion' and a polarization of a nanometric scale ($10^{-7} < r < 10^{-13}$) is obtained. The flux of the Poynting vector n1 and n2 relating to electromagnetic waves OAM (related to the orbital angular momentum) then induce a residual torsion field whose final characteristics are linked to the forces of Van der Waals of the selected material, to the frequency of the electromagnetic wave, to the intensity of magnetic field emitted by the magnetic loop and to the angular momentum of rotation $2\pi/I$.

The influence of the torsion field defines itself in a similar way to that of the Alfven waves with Va, the speed of the Alfven waves being proportional to electromagnetic field, $Va = B/\sqrt{\rho \mu o}$ and induces a wavelength of type:
$\lambda = Va \cdot 2\pi/f$ With the magnetic field induced, μo, the permeability of vacuum and p the density of ionized particles, which corresponds to the characteristics of Van der Waals forces, and the frequency of the wave.

The residual field then integrates a scalar component SC (the component of the Alfven wave here, being linked to pure imaginary) whose characteristics are apt to modify a conventional electromagnetic wave and to influence the cohesion of water, especially if the wavelength of λ is harmonic to the cohesion frequency of water.

The process begins with the targeted material (in which one wishes to integrate a scalar component SC) being submitted to the ionization field allowing for the readiness of the elements. As described with FIGS. 1-3, ionization of the material (e.g. ink) is preferably performed at 15,000 volts DC for a time period of approximately 48 hours, though other voltages and time periods are anticipated and the present invention is in no way limited to any particular voltage and/or time period.

Once the material is ionized, the material is subjected to a scalar generator as in FIG. 13 with two electromagnetic waves with a nonzero orbital angular momentum by way of a de-phasing factor: $2\pi/l$. Two electromagnetic waves are emitted at equal distances, d from the targeted material (e.g., ink), one electromagnetic wave being in phase, the other electromagnetic wave being in counter phase as in FIG. 13 with an orbital angular momentum (Torsion factor) as in FIG. 14. The electromagnetic waves develop in the plane $H_1$ and $H_2$ determining the space. The cancellation of electromagnetic waves (according to the phase and counter phase) is populated in a plane $H_3$ perpendicular to $H_1$ and $H_2$ and generates a Torsion factor with a scalar field SC as in FIG. 14. When the electromagnetic waves cancel each other out, it is the $H_3$ plane that is structuring itself with a magnetic oscillation wave corresponding to the characteristics of Alfven waves.

Figure 15:
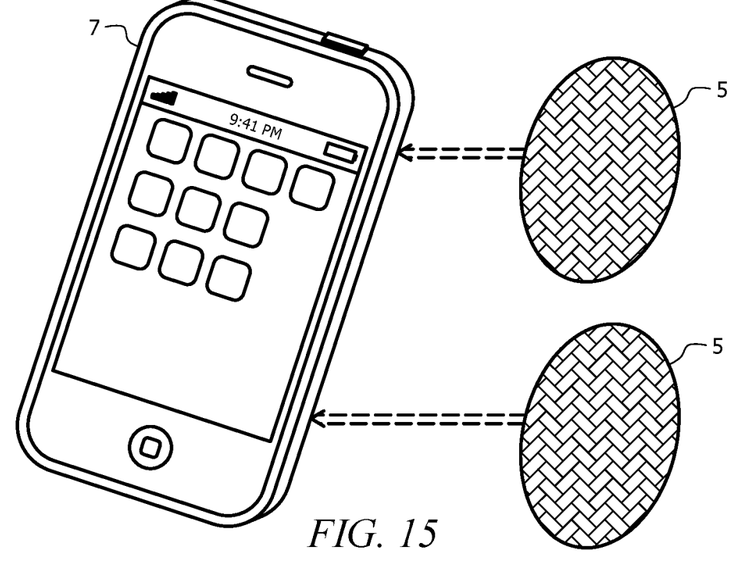
FIG. 15 illustrates a perspective view of a device onto which the biotech adapters printed as per the process are to be applied.
Figure 16:
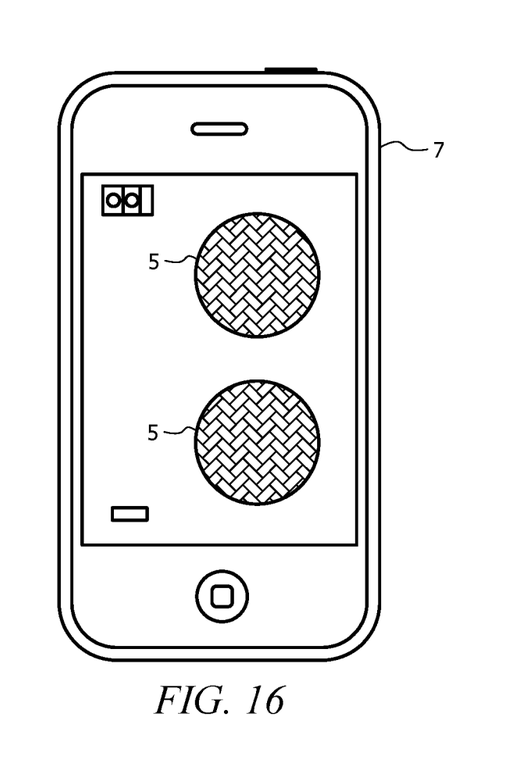
FIG. 16 illustrates a rear plan view of the device onto which the biotech adapters printed as per the process have been applied.

Referring to FIGS. 15 and 16, a perspective view of a device 7 with the biotech adapters 5 printed as per the above processes and apparatus. FIG. 16 shows the biotech adapters 5 being applied to the device 7 and FIG. 16 shows a rear plan view of the device 7 onto which the biotech adapters 5 have been applied. The inks used to print the biotech adapter 5 comprise a torsion component such that the inks provide waveforms that are beneficial to lifeforms when the biotech adapter is exposed to radio waves in the microwave range, as emitted from devices 7 such as cellular phones, cordless phones, Bluetooth headphones, portable music players, Wi-Fi routers, other wireless devices, other electronic devices, etc.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A biotech adapter comprising:
   a substrate with an adhesive backing;
   a plurality of inks, prior to printing, each of the plurality of the inks is subjected to an ionization field for a period of time, for increasing the integration of the scalar component by increasing the polarization of the Van der Waals forces of each of the inks; and
   a scalar generator interfaced to a printing press such that when the printing press deposits the inks onto the substrate, two electromagnetic waves are present at the substrate with a nonzero orbital angular momentum, such that the two electromagnetic waves cancel each other out by counter phase at the location at which the ink is deposited, the electromagnetic waves having a field frequency;
   wherein the ink so deposited possesses an integrated scalar characteristic of a magnetic oscillation wavelength close to that of the structure of water.

2. The biotech adapter of claim 1, further comprising a second scalar generator interfaced to the printing press at a 90 degree angle to the scalar generator such that when the printing press deposits the inks onto the substrate, a second set of two electromagnetic waves at a 90 degrees offset are present at the substrate with a nonzero orbital angular momentum, such that the two electromagnetic waves cancel each other out by counter phase at the location at which the ink is deposited, the electromagnetic waves having a field frequency.

3. The biotech adapter of claim 1, wherein the frequency is 8.06544 Hz.

4. The biotech adapter of claim 1, wherein the frequency is of a magnetic intensity of 1 Tesla.

5. The biotech adapter of claim 1, wherein the inks comprise cyan ink, magenta ink, yellow ink, black ink, silver ink, and gold ink.

6. The biotech adapter of claim 1, whereas the time period is at least 48 hours.

* * * * *